UNITED STATES PATENT OFFICE.

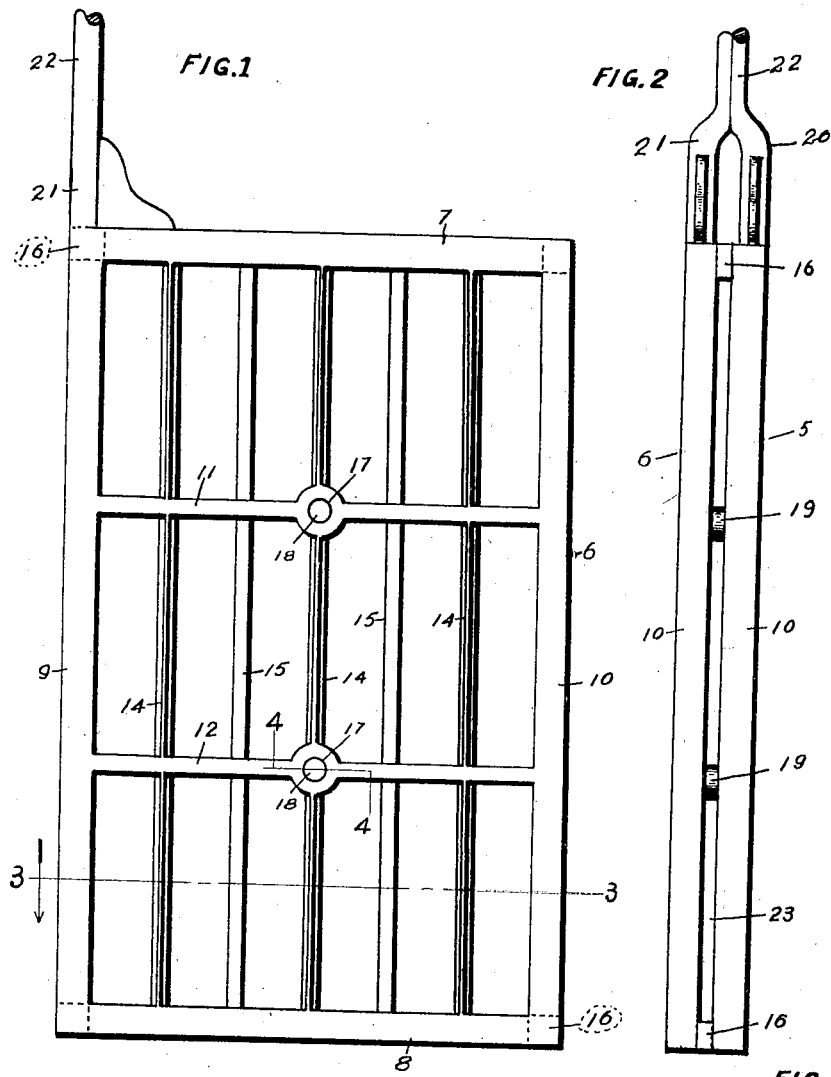

JAMES M. ALLEN, OF ST. LOUIS, MISSOURI, ASSIGNOR, BY DIRECT AND MESNE ASSIGNMENTS, TO JAMES M. ALLEN, FRED P. SMITH, AND FREDERICK D. TUCKER, TRUSTEES FOR THE SMITH-ALLEN BATTERY COMPANY, OF ST. LOUIS, MISSOURI.

ELECTRODE FOR SECONDARY OR STORAGE BATTERIES.

1,347,832.     Specification of Letters Patent.     Patented July 27, 1920.

Application filed August 18, 1919. Serial No. 318,081.

*To all whom it may concern:*

Be it known that I, JAMES M. ALLEN, a citizen of the United States, and resident of St. Louis and State of Missouri, have invented certain new and useful Improvements in Electrodes for Secondary or Storage Batteries, of which the following is a specification, containing a full, clear, and exact description, reference being had to accompanying drawings, forming a part thereof.

My invention relates to electrodes for secondary or storage batteries and has for its primary object the construction of an electrode of two plates of grid formation, which plates are filled and spaced apart so that the electrolyte may have free circulation between and around the two plates of which the electrode is formed.

In the drawings, Figure 1 is a plan view of my improved electrode, the paste or filler being removed.

Fig. 2 is an edge view of the same.

Fig. 3 is a section taken on the line 3—3 looking in the direction of the arrow.

Fig. 4 is an enlarged fragmental sectional view taken on the line 4—4 of Fig. 1.

Referring to the drawings, 5 and 6 indicates the two members or plates out of which my improved electrode is made. Said plates are preferably rectangular in form, and are composed of top bars 7 and bottom bars 8, the bottom and top bars 7 and 8 being connected by side bars 9 and 10.

Intermediate of the top bars 7 and bars 8 are transverse bars 11 and 12, and a series of vertical bars 14 and 15. These vertical bars 14 and 15 are wedge shaped in formation, and when the two plates 5 and 6 are united they form the complete electrode. The bars 15 are interposed between the bars 14, as illustrated in Fig. 3.

Located between the plates 5 and 6 at each corner are plugs 16 which are illustrated in dotted lines in Fig. 1, and also illustrated in Fig. 3.

Formed centrally of the bars 14 in each plate are openings 17 in which are located rivets 18. Said rivets 18 are provided with a spacing shoulder 19. The two plates 5 and 6 are connected by means of plugs 16, and the rivets 18 by welding.

Each of the plates 5 and 6 are provided with projections 20 and 21 respectively which are welded together and form a terminal 22. When these projections 20 and 21 are welded together they assist in holding the two plates together at the top. The plugs 16 and shoulders 19 of the rivets 18 hold the plates together in spaced apart relation, forming a space between the plates as indicated by 23.

In making up the electrodes the two plates 5 and 6 are filled with any suitable paste of active material, such as lead oxid, and when each plate 5 and 6 has been filled with the lead oxid paste they are united together by welding the plugs 16 and the rivets 18 and the projections 20 and 21.

The electrode thus made up has an opening or space 23 extending clear through the same through which the electrolyte may freely pass. It will be seen from this that the paste applied to the plates 5 and 6 is subjected on all sides to the action of the electrolyte. The two plates being fastened together securely at the top and bottom and intermediate the top and bottom form, as it were, a kind of a truss structure which prevents the electrode from buckling.

Having fully described my invention, what I claim is:

1. An electrode comprisng two plates of like construction, a plug located between the corners of each plate, rivets provided with spacing shoulders located between the bottom and top of the plates, said plug and rivets being welded to said plates for securing the same together and holding said plates spaced apart, projections formed on the top of each plate and welded together to form a terminal, and a series of substantially V shaped bars in cross-section formed on each plate, some of the bars on one plate being interposed between some of the bars on the other plate when said plates are connected together.

2. An electrode comprising two complementary members, each of which is provided with transverse and longitudinal bars spaced apart, said members being capable of holding an active material and being uniformly spaced apart entirely from top to bottom and from side to side, whereby the active material in both plates may be subjected to the electrolyte on four sides throughout the entire surfaces of the plates, and means for holding said members in such spaced relation.

In testimony whereof, I have signed my name to this specification, in the presence of two subscribing witnesses.

JAMES M. ALLEN.

Witnesses:
 E. M. SCHUCHARDT,
 JEAN GOLDBERG.